United States Patent
Gilman et al.

(10) Patent No.: US 9,751,255 B2
(45) Date of Patent: Sep. 5, 2017

(54) HAND-HELD CHANNEL MARKER

(71) Applicant: Gilman Corporation, Gilman, CT (US)

(72) Inventors: Elizabeth A. Gilman, Gilman, CT (US); Richard L. Gilman, Gilman, CT (US)

(73) Assignee: GILMAN CORPORATION, Gilman, CT (US)

( * ) Notice: Subject to any disclaimer, the term of this patent is extended or adjusted under 35 U.S.C. 154(b) by 0 days.

(21) Appl. No.: 14/947,324

(22) Filed: Nov. 20, 2015

(65) Prior Publication Data

US 2016/0375964 A1    Dec. 29, 2016

Related U.S. Application Data

(60) Provisional application No. 62/184,937, filed on Jun. 26, 2015.

(51) Int. Cl.
| | |
|---|---|
| *B63B 22/00* | (2006.01) |
| *B29C 65/00* | (2006.01) |
| *B63B 22/20* | (2006.01) |
| *B29K 105/04* | (2006.01) |
| *B29L 31/00* | (2006.01) |
| *B29C 73/04* | (2006.01) |
| *B29C 73/34* | (2006.01) |

(52) U.S. Cl.
CPC ............ *B29C 65/002* (2013.01); *B63B 22/20* (2013.01); *B29C 73/04* (2013.01); *B29C 73/34* (2013.01); *B29K 2105/046* (2013.01); *B29L 2031/706* (2013.01)

(58) Field of Classification Search
CPC ..... B63B 22/20; B63B 22/166; B26C 65/002; B29C 73/00

USPC .......................................................... 114/357
See application file for complete search history.

(56) References Cited

U.S. PATENT DOCUMENTS

| | | | | |
|---|---|---|---|---|
| 3,372,507 | A * | 3/1968 | Luketa ................. | A01K 73/045 43/9.7 |
| 4,033,002 | A * | 7/1977 | Higgs ..................... | B63B 22/20 441/26 |
| 4,669,989 | A * | 6/1987 | Havlick .................. | B63B 22/00 441/1 |
| 4,994,501 | A * | 2/1991 | Shulman .................. | C08J 9/142 521/117 |
| 7,156,712 | B1 * | 1/2007 | Mercer ................. | B63B 22/166 441/11 |
| 2005/0084418 | A1 * | 4/2005 | Hill ........................ | B63B 22/24 422/50 |

OTHER PUBLICATIONS

Shore Infrastructure Logistics Center; Specification for Fabrication of Ionomer Foam Buoys; May 2009, 18 pages.

* cited by examiner

*Primary Examiner* — Stephen Avila
(74) *Attorney, Agent, or Firm* — Cantor Colburn LLP

(57) ABSTRACT

A buoy comprising: an annular upper portion disposed on a lower portion; a drain hole disposed in the upper portion proximate to the lower portion; a handhold disposed in the upper portion distal to the lower portion; an attachment member disposed in the lower portion and protruding from a bottom of the lower portion, wherein the bottom is opposite the upper portion; and wherein at least one of the upper portion and the lower portion comprises a closed cell foam.

12 Claims, 6 Drawing Sheets

HAND-HELD CHANNEL MARKER

CROSS REFERENCE TO RELATED APPLICATION

This application claims the benefit of U.S. Provisional Application No. 62/184,937 filed on Jun. 26, 2015, the entirety of which is incorporated by reference herein.

BACKGROUND

In most inland water ways, conventional buoys that are utilized are nun, can, and danger buoys. Such buoys may, or may not, be lighted. Wherever used, however, it is desirable to ensure that the buoys will resist fracture, puncture, or distortion even when struck by water craft, or when buffeted by waves along the shoreline. It is desirable to have the buoys be virtually unsinkable, yet simple to manufacture. Many of the available channel markers meet many of these criteria but suffer drawbacks in terms of weight, size and the ability of an average person to move the marker—into the water, out of the water and to maneuver the marker once out of the water. Furthermore, there are no channel markers in the prior art which are unsinkable, have a replaceable ballast, are self-draining, and repairable.

There remains a need for a buoy that is sufficiently lightweight and manageable in size, weight and design to permit the buoy to be moved by a single person or with less lifting equipment.

BRIEF DESCRIPTION

Disclosed herein is a buoy comprising: an annular central component having an upper end, a drain hole, a hand hold and a lower end. A collar is disposed around the annular central component and a ballast component is disposed on the lower end of the annular central component. The ballast component has an attachment member protruding from the ballast opposite the lower end. The annular central component, the collar, or both comprise a closed cell foam.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

The buoys described herein advantageously comprise closed cell polymeric foam which greatly decreases their weight. The presence of handholds facilitates handling of the buoys. The buoys have a drain hole which allows accumulated water to drain from the center of the buoy. The drain hole can be located above or below the collar. When the buoy is in the water the water line lies along the collar perimeter. When the drain hole is located above the collar the drain hole allows rain water or water from a wave to drain from the center of the buoy, thereby allowing the buoy to maintain buoyancy. Also, when the buoy is removed from the water the drain hole allows the water in the center of the buoy to drain, thereby providing a light weight article for movement and manipulation.

When the drain hole is located below the collar, the water which enters the annular central component functions as ballast. This self-ballasting feature provides additional ballast for the buoy when in the water while providing a means for the water to be drained when the buoy is removed from the water, making the buoy lighter to handle out of the water.

The drain hole is typically located above the collar in buoys having a height of 15 to 30 inches above the waterline. The drain hole is typically located below the collar in buoys having a height of 31 to 60 inches above the water line.

The annular central component, the collar, or both comprise a closed cell polymeric foam. The polymeric foam can comprise an ionomer, polybutylene terephthalate, polyethylene terephthalate, or a combination thereof. In some embodiments the polymeric foam comprises an ionomer. Exemplary ionomers are commercially available as Surlyn® and Iotek®.

Figure 1:
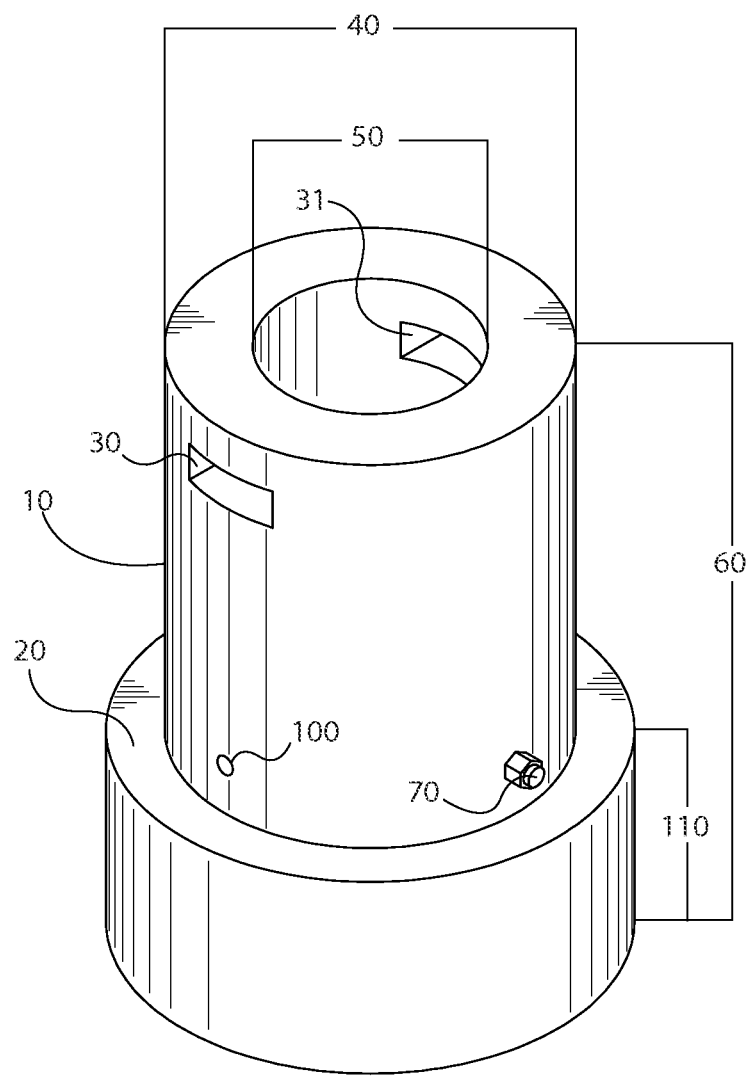
FIGS. 1 through 10 are schematic drawings of the buoys described herein.

Turning now to the Figures, FIG. 1 shows a buoy having an annular central component 10, a collar 20, and at least one drain hole 100. It is contemplated that the annular central component may comprise a plurality of drain holes, e.g., 1 to 10, 2 to 8, or 3 to 6 drain holes. When the annular central component comprises a plurality of drain holes the drain holes may be grouped together proximate to the collar or distributed around the circumference of the annular central component proximate to the collar. The drain holes have a diameter of 1.2 centimeter (cm) to 10 cm, 2 cm to 8 cm, or 3 cm to 5.5 cm. The annular central component comprises a first handhold 30 and a second handhold 31 located 30° to 180°, 60° to 160°, preferably 180° from the first handhold. The annular central component can comprise a single handhold or 2 or more handholds, e.g., 1 to 10, 2 to 8, or 3 to 6 hand holds. The annular central component has an outer diameter 40, an inner diameter 50 and a height 60. The outer diameter can be 10 cm to 457 cm, or 10 cm to 365 cm, or, 10 cm to 61 cm, or 10 cm to 45 cm, or 20 cm to 457 cm, or 30 cm to 365 cm, or, 40 cm to 61 cm. The inner diameter is chosen so that the wall of the annular central component has a thickness of 2.5 cm to 15.5 cm, 2.5 cm to 13 cm, or 2.5 cm to 11 cm, or 3 cm to 15.5 cm, 4 cm to 13 cm, or 5 cm to 11 cm. The collar has a height 110 and an outer diameter 120 and is made from a closed cell foam. The height 110 can be 5% to 50%, 7% to 40%, or 9% to 30% of the height of the annular central component. The outer diameter of the collar is greater than outer diameter 40, and can be 2.5 cm to 41 cm, or 2.5 cm to 31 cm, or 2.5 cm to 25.5 cm, or 3 cm to 41 cm, or 4 cm to 31 cm, or 5 cm to 25.5 cm greater than the outer diameter 40.

Figure 2:
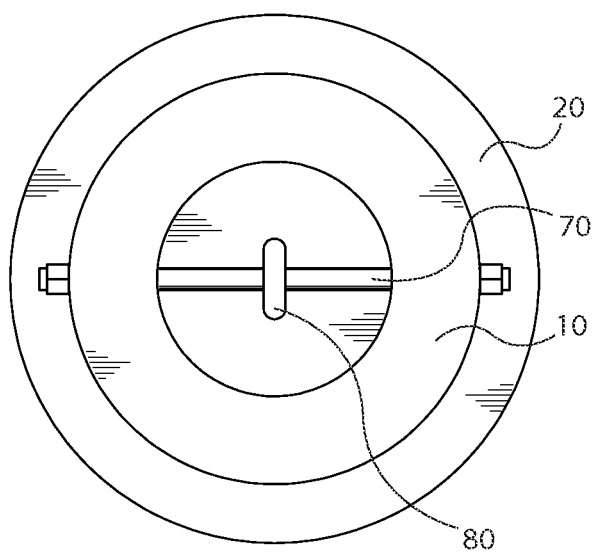

FIG. 2 is a view from the top of the buoy and shows retaining member 70 running across the diameter and through the walls of the annular central component. When the drain hole is above the collar the distance 150 from the top of the collar to retaining member 70 can be 1.2 cm to 13 cm, or 2.5 cm to 10.2 cm, or 3.8 cm to 7.7 cm. While FIG. 2 shows a single retaining member it is also contemplated that other retaining member configurations may be employed depending on design considerations such a ballast weight and structural support requirements. For example, the retaining member configuration may be a triangle, an X or hexagon with the caveat that the retaining member configuration allows for a connection member 80 from the retaining member 70 to the attachment member.

Figure 3:
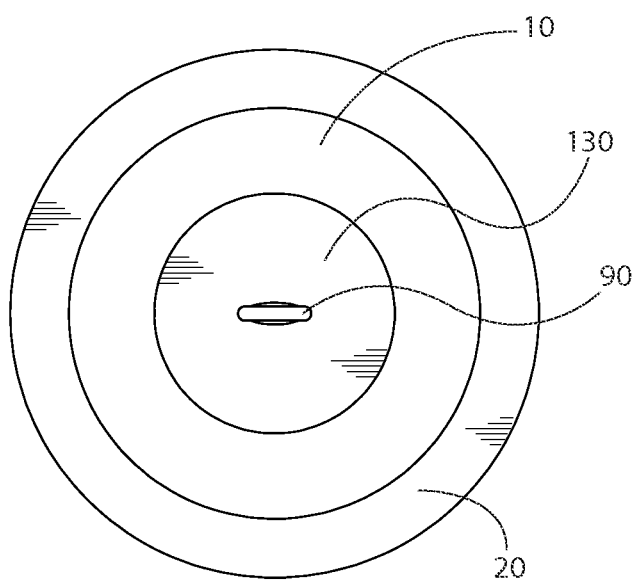

As shown in FIG. 3, a view from the bottom of the buoy, a ballast 130 is disposed between the attachment member 90 and the lower end of the annular central component. The ballast may be unitary or modular and can easily be replaced as needed. When modular, modules, e.g., metal plates, may be added or removed to adjust the total quantity of ballast as desired. In an exemplary embodiment the ballast is modular and comprises at least one ballast plate. The ballast plate may comprise any suitable metal, such as steel, stainless steel, zinc, iron, or a combination thereof. Also, the ballast plate may have any suitable shape, and may be circular, square, rectangular, or a combination thereof. The ballast plate may be large enough to cover the inner diameter 50 of the annular central component. The retaining member 70 and the connection member 80 can be made from any suitable material, such as a metal, such as steel, stainless steel, or aluminum, or polymeric material such as nylon, polyurethane, polyvinyl chloride, or polycarbonate. A combination comprising at least one of the foregoing may be used. Stainless steel, such as 316 stainless steel, is specifically mentioned. The ballast 130 and the attachment member 90 may be made from any suitable material, preferably a material having a density greater than 2 grams per cubic centimeter ($g/cm^3$), e.g., a material having a density of 2 to 9 $g/cm^3$. The ballast may comprise a metal. The metal may comprise iron, cobalt, nickel, molybdenum, magnesium, aluminum, silicon, copper, silver, chromium, zinc, or combination thereof. The metal may be an alloy, such as steel, or a zinc alloy. In some embodiments the attachment member 90 comprises an eye bolt. The attachment member may further comprise a coating, such as galvanizing, if desired.

Figure 4:
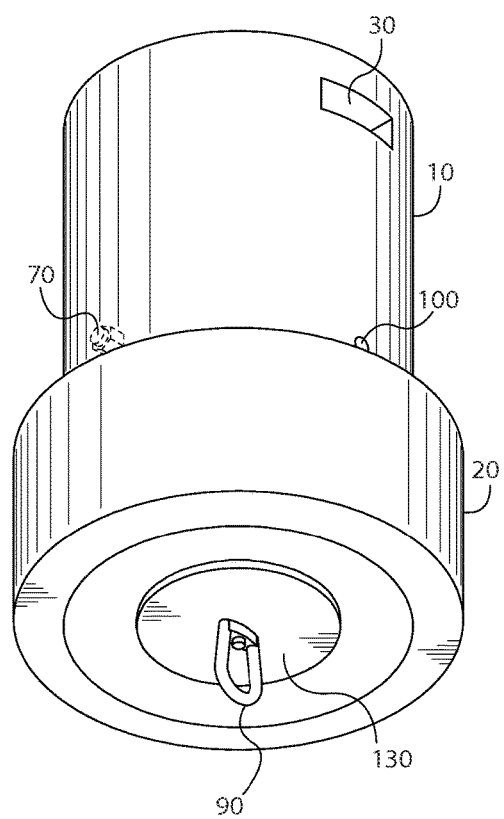

FIG. 4 is another view showing the attachment member 90 and ballast 130 in relation to the buoy.

Figure 5:
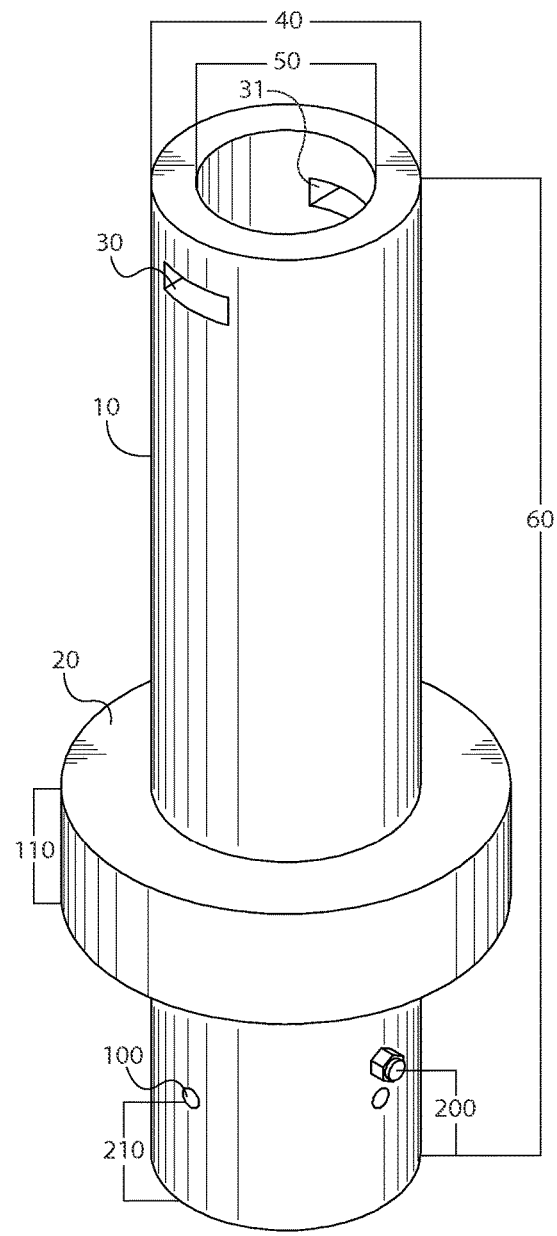

In another embodiment FIG. 5 shows a buoy having an annular central component 10, a collar 20, and a drain hole 100 below the collar. The annular central component has a height 60, an inner diameter 50, an outer diameter 40 and handholds as described above with regard to FIG. 1. The collar has a height 110 and an outer diameter as described with regard to FIGS. 1-4. The annular central component has at least one drain hole 100 between the collar and the lower end of the annular central component. In some embodiments the annular central component has at least two ballast holes, at least three ballast holes, or at least four ballast holes located between the collar and the lower end of the annular central component. When multiple ballast holes are employed they can be grouped close together or they can be evenly or unevenly spaced around the circumference of the annular central component. The annular central component has a distance 200 from the lower end to the retaining member and a distance 210 from the lower end to the ballast hole. The distance 200 can be 5 to 50%, 7% to 40%, or 9% to 30% of the height of the annular central component. The distance 210 can be 5 to 50%, 7% to 40%, or 9% to 30% of the height of the annular central component. In some embodiments the distance 210 is less than the distance 200.

Figure 6:
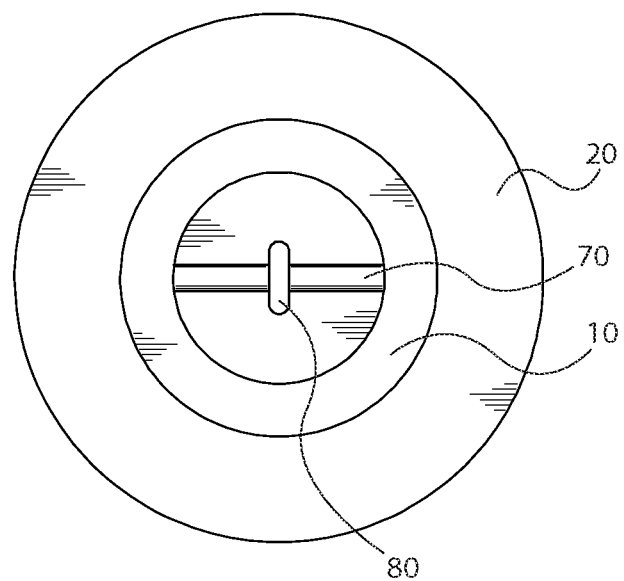
Figure 7:
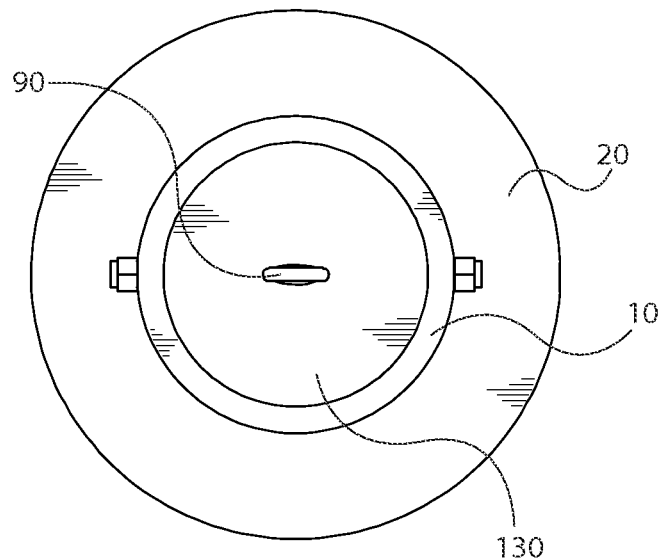
Figure 8:
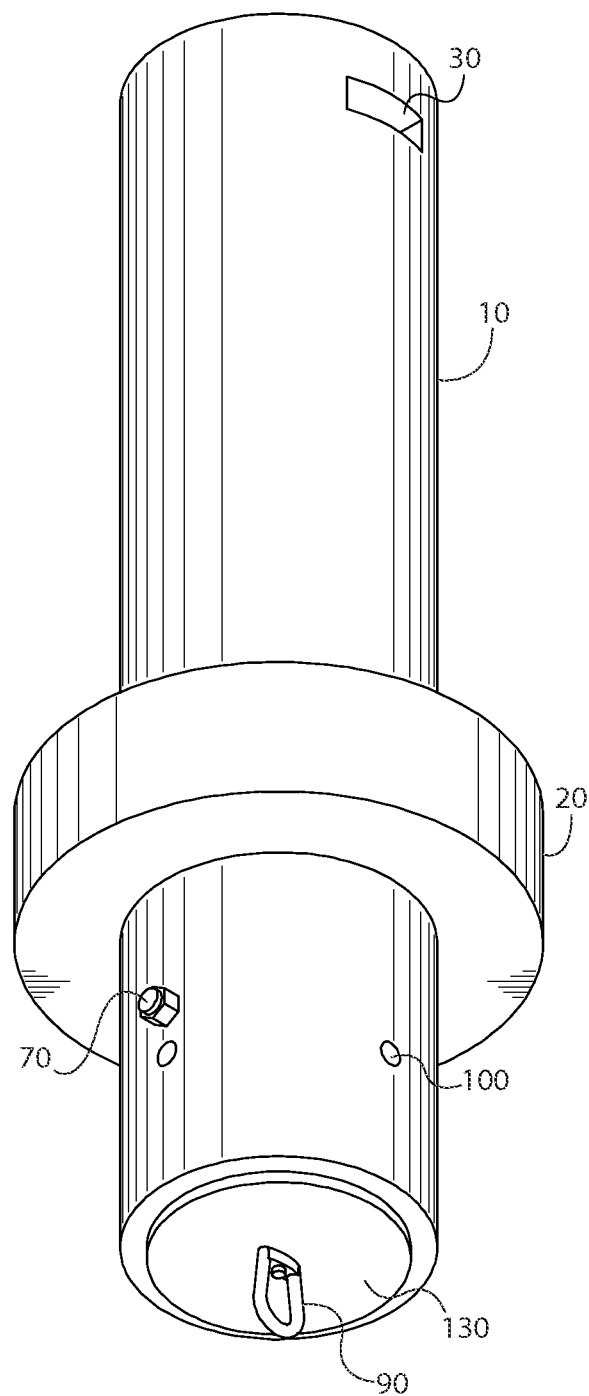

As shown in FIGS. 6-8 the annular central component further comprises a retaining member 70, a connection member 80, an attachment member 90, and a ballast 130 as described above.

Figure 9:
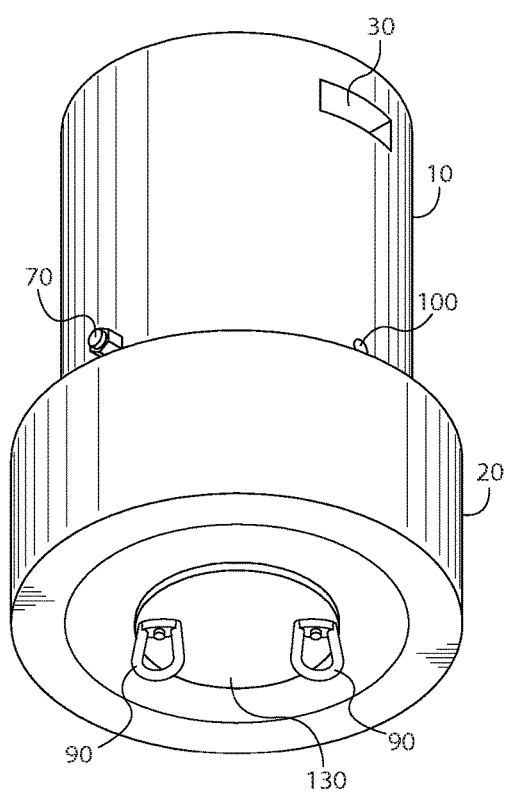
Figure 10:
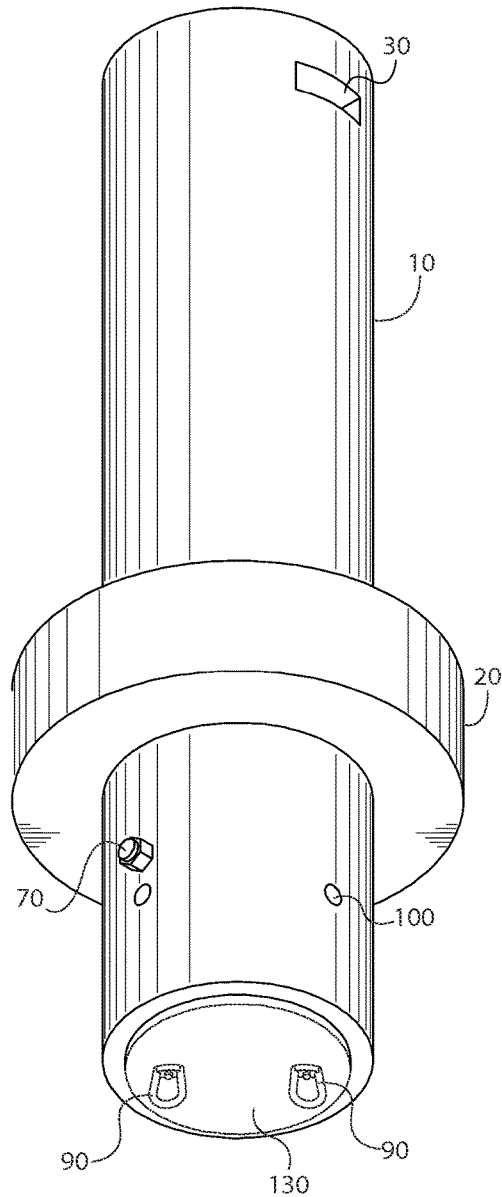

As shown in FIGS. 9 and 10, the buoy may comprise two attachment members 90. In this case the buoy would also comprise two connection members (not shown).

The buoy may further comprise a light, a radar reflector, or both.

There is no particular limitation on the coloration of the buoy. Typically buoys are colored and marked according to standard navigational protocols. Optional marking materials include reflective materials.

The buoy has a land weight of 4.5 kilograms (kg) to 226 kg, or 5 kg to 200 kg, or 6 kg to 100 kg. Land weight is defined as the weight of the buoy on land without any water ballast.

The buoy is made by providing the annular central component having a hand hold and a lower end distal to the hand hold, providing the collar, attaching the collar to the annular central component, and disposing the ballast and the attachment member on the lower end of the annular central component. The collar can be attached by adhesive, heating and melting the closed cell foam, stainless steel rods, or a combination comprising at least one of the foregoing.

In the event of damage to the buoy, the buoy can be repaired by heating the area to be repaired, disposing a closed cell foam in the area, heating the closed cell foam and contacting the heated closed cell foam with an iron to complete the repair.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A buoy comprising:
   an annular central component having an upper end and a lower end;
   a drain hole disposed in a wall of the central component,
   a hand hold disposed in a wall of the central component;
   a collar disposed around the annular central component;
   a ballast disposed on the lower end of the annular central component;

an attachment member protruding from the ballast and in a direction opposite the lower end;

wherein the hand hold is proximate to the upper end; and wherein the annular central component comprises the same closed cell foam over the entirety of the annular central component.

2. The buoy of claim 1, wherein the attachment member comprises an eyebolt.

3. The buoy of claim 2, further comprising a retaining member and a connection member.

4. The buoy of claim 3, wherein the retaining member is disposed between the collar and the upper end.

5. The buoy of claim 4, wherein the drain hole is disposed between the collar and the upper end.

6. The buoy of claim 3, wherein the retaining member is disposed between the collar and the lower end.

7. The buoy of claim 6, wherein the drain hole is disposed between the collar and the lower end.

8. The buoy of claim 1, wherein the ballast comprises at least two ballast plates.

9. The buoy of claim 1, further comprising a light, a radar reflector or both.

10. The buoy of claim 1, wherein the buoy comprises two or more attachment members.

11. A method of marking a location and a body of water, the method comprising disposing a buoy in the body of water, the buoy comprising:

an annular central component having an upper end and a lower end;

a drain hole disposed in a wall of the central component, a hand hold disposed in a wall of the central component;

a collar disposed around the annular central component;

a ballast disposed on the lower end of the annular central component;

an attachment member protruding from the ballast and in a direction opposite the lower end;

wherein the hand hold is proximate to the upper end; and wherein the annular central component comprises the same closed cell foam above and below the collar.

12. A method of repairing a buoy, the method comprising:

heating an area of closed cell foam to be repaired;

disposing a repair material comprising closed cell foam in the area;

heating the repair material; and contacting the heated repair material with an iron to repair the buoy.

* * * * *